United States Patent [19]
Allard et al.

[11] Patent Number: 5,844,207
[45] Date of Patent: Dec. 1, 1998

[54] CONTROL FOR AN ELECTRIC HEATING DEVICE FOR PROVIDING CONSISTENT HEATING RESULTS

[75] Inventors: John Allard; Robert Scott Myerly, both of Hattiesburg, Miss.

[73] Assignee: Sunbeam Products, Inc., Delray Beach, Fla.

[21] Appl. No.: 642,273

[22] Filed: May 3, 1996

[51] Int. Cl.⁶ ...................................................... H05B 1/02
[52] U.S. Cl. ........................ 219/497; 219/518; 219/501; 219/492; 99/329 P
[58] Field of Search .................................. 219/497, 518, 219/519, 481, 499, 501, 492; 99/327, 328, 329 R, 329 P; 323/235, 318, 322

[56] References Cited

U.S. PATENT DOCUMENTS

| | | |
|---|---|---|
| 2,431,195 | 11/1947 | Olving . |
| 2,451,508 | 10/1948 | Olving . |
| 2,541,436 | 2/1951 | Olving . |
| 2,560,386 | 7/1951 | Gomersall . |
| 2,560,388 | 7/1951 | Olving . |
| 2,631,524 | 3/1953 | Theisen . |
| 3,279,352 | 10/1966 | Jepson et al. . |
| 3,431,400 | 3/1969 | Iida et al. . |
| 3,553,428 | 1/1971 | McGhee .................................. 219/494 |
| 3,785,079 | 1/1974 | Rohn . |
| 3,794,808 | 2/1974 | Takagi . |
| 4,223,207 | 9/1980 | Chow ...................................... 219/494 |
| 4,296,312 | 10/1981 | Salem . |
| 4,395,621 | 7/1983 | Parker . |
| 4,435,677 | 3/1984 | Thomas ................................... 323/235 |
| 4,458,140 | 7/1984 | Belinkoff . |
| 4,645,909 | 2/1987 | Thoben et al. . |
| 4,742,246 | 5/1988 | Mori . |
| 4,755,656 | 7/1988 | Charlesworth et al. . |
| 4,859,926 | 8/1989 | Wolze ..................................... 323/241 |
| 4,894,518 | 1/1990 | Ishikawa et al. . |
| 5,044,263 | 9/1991 | Birkert et al. . |
| 5,088,389 | 2/1992 | Labadia del Fresno . |
| 5,094,154 | 3/1992 | Nopanen . |
| 5,128,521 | 7/1992 | Lanno et al. . |
| 5,294,050 | 3/1994 | Hoffman et al. . |
| 5,319,171 | 6/1994 | Tazawa . |
| 5,332,886 | 7/1994 | Schilling et al. . |
| 5,402,708 | 4/1995 | Krasznai et al. . |

*Primary Examiner*—Mark H. Paschall
*Attorney, Agent, or Firm*—Dennis M. Carleton

[57] ABSTRACT

A control for an electric heating device for adjusting the duration of the device's heating cycle in order to effectively compensate for variations in the operating voltage supplied to the device. The control includes a means for adjusting the duration of the heating cycle, wherein the adjustment means generates a control voltage for controlling the duration of the heating cycle that is a dynamic function of the magnitude of the operating voltage.

8 Claims, 2 Drawing Sheets

CONTROL FOR AN ELECTRIC HEATING DEVICE FOR PROVIDING CONSISTENT HEATING RESULTS

FIELD OF THE INVENTION

The present invention relates to an improvement for an electric heating device, such as a toaster, wherein the duration of the heating cycle is adjusted in order to provide consistent heating results.

BACKGROUND OF THE INVENTION

AC line voltage is the standard source of operating power for most electrical appliances. Although specified in the United States to be 120 volts, AC line voltage typically varies from as low as 108 volts to as high as 130 volts. This fluctuation in voltage can negatively affect the operation of some electrical appliances.

Especially affected are electric cooking devices such as toasters which, unlike conventional ovens, do not cook a food product for a time period and at a temperature which are both directly preset by the user. Instead, such cooking devices cook a food product for a time period that corresponds to the setting of a "doneness" control, and at a temperature that is controlled by the magnitude of the voltage applied to the heating elements of the cooking device which voltage is the same as, or proportional to, the AC line voltage. In such electric cooking devices, the time required to cook a food product to a particular level of doneness varies with fluctuations in the AC line voltage. As the line voltage increases, the heat generated by the heating elements of the cooking device increases, thus reducing the required cooking time. Similarly, as the line voltage decreases, the heat generated by the heating elements of the cooking device decreases, thus increasing the required cooking time. As such, the duration of the cooking cycle of such electric cooking devices must be adjusted in order to compensate for AC line voltage fluctuations if consistent cooking results are to be achieved from one cooking cycle to the next.

Particular attention has been given to the above-mentioned problem in connection with electric toasters. In such electric toasters, the user is able to select the extent to which the food product inserted therein is to be toasted by the manual adjustment of an external doneness control typically having doneness settings ranging from "light" to "dark". These settings correspond to the desired color of the toasted product. Adjustment of the doneness control affects the duration of the toasting cycle that is established by a timing circuit within the toaster.

The timing circuit of a toaster typically includes a counter having a counting period that directly establishes the duration of the toasting cycle. This counting period is determined by the frequency of an oscillating signal that is supplied to the counter by an oscillator. The doneness control of the toaster, typically in the form of a potentiometer, affects the frequency of this signal, thus enabling the doneness control to affect the duration of the toasting cycle.

It is known to adjust the duration of the toasting cycle to compensate for a variety of factors, in addition to AC line voltage variations, which affect the time required to toast a food product to a particular level of doneness. One such factor affecting the required toasting time is the initial temperature within the toasting cavity of the toaster. When the toaster is operated after a certain period of nonuse (usually a few minutes), the toasting cavity will be at room temperature at the beginning of the toasting cycle. Therefore, the required toasting time includes the time needed for the heating element to raise the temperature within the toasting cavity to the optimal toasting temperature at which the food product can actually be cooked. However, when the toaster is operated for consecutive toasting cycles, the temperature within the toasting cavity at the beginning of the second and any subsequent cycles is already at or near the optimal toasting temperature. In these circumstances, little, if any, preheating time is necessary, resulting in a required toasting time that is less than if consecutive toasting cycles had not been performed.

Another factor affecting the required toasting time is the characteristics of the food to be toasted. In conventional toasters, it is known to provide toasting slots of suitable dimension to receive various types of food products such as bread, bagels, and english muffins. Because of the different sizes, shapes, and thicknesses of these different food products, the required toasting time of each of them can vary substantially.

Although prior art toasters have had some success in compensating for the initial temperature of the toasting cavity and the characteristics of the food to be toasted, such toasters have been unable to provide effective compensation for fluctuations in the AC line voltage. Such fluctuations can dramatically affect the required toasting times, often changing such times anywhere from 30% to 100%.

Typically, prior art toasters have attempted to compensate for variations in the magnitude of the line voltage by employing either a heat sensitive resistive or capacitive element as a component within an RC network that is coupled to the oscillator of the timing circuit. Such toasters are illustrated, for example, in U.S. Pat. No. 5,402,708. This heat sensitive element is positioned so as to sense the temperature changes of another element, usually the toasting cavity or a dropping resistor, that are caused by the AC line voltage variations. The resistance or capacitance of the heat sensitive element varies in response to these temperature changes, thus adjusting the duration of the toasting cycle.

Although the above method provides some compensation for AC line voltage variations, the inherent nature of thermal sensing prevents the heat sensitive element from sensing the variations in line voltage, and responding thereto, in a timely manner. This creates a lag time between the fluctuation of the line voltage and the adjustment of the toasting cycle duration. Because the total time period required to toast a food product is relatively short (usually less than two minutes), this lag time prevents effective voltage compensation from being provided.

Thus, there exists a need for an improved means of compensating for AC line voltage variations so that the duration of the heating cycle of a toaster or similar electric device can be adjusted in a timely manner.

SUMMARY OF THE INVENTION

The present invention provides an improved means of compensating for variations in the operating voltage of an electric heating device. The duration of the heating cycle of the device is adjusted in a timely manner in response to such variations, thus solving the above-mentioned problems.

The present invention is embodied in a control for an electric heating device and includes a means for determining the duration of the heating cycle. The determining means includes a means for voltage compensation that is coupled to the operating voltage and which generates a first voltage that is substantially proportional to the magnitude of the square of the operating voltage. The determining means establishes the duration of the heating cycle as a function of the first voltage such that the duration of the heating cycle is increased when the magnitude of the first voltage decreases, and is decreased when the magnitude of the first voltage increases. Included is a means for heating and a means for coupling said heating means to the operating voltage for the duration of the heating cycle.

These and other features, advantages, and objects of the present invention will be further understood and appreciated by those skilled in the art by reference to the following specification, claims, and appended drawings.

DETAILED DESCRIPTION OF THE PREFERRED EMBODIMENT

The present invention can be implemented in a wide variety of electric devices including, but not limited to, toasters, toaster ovens, ovens, stoves, breadmakers, and wafflemakers, and as used herein, the term "electric device", is intended to include, but not necessarily be limited to, all such devices. For example, the benefits of the present invention may be useful in a space heater, electric clothes drier, dishwashers, and essentially any electrical appliance wherein fluctuations in incoming line voltage can negatively impact the performance of the appliance during use. The following detailed description of the preferred embodiment of the present invention focusses on its specific implementation within an electric toaster for the purposes of explanation. Furthermore, although the present invention is described in terms of its ability to compensate for fluctuations in AC line voltage, it can readily be used to compensate for fluctuations in any type of operating voltage, AC or DC, and of operating voltage of any standard magnitude.

Figure 1:
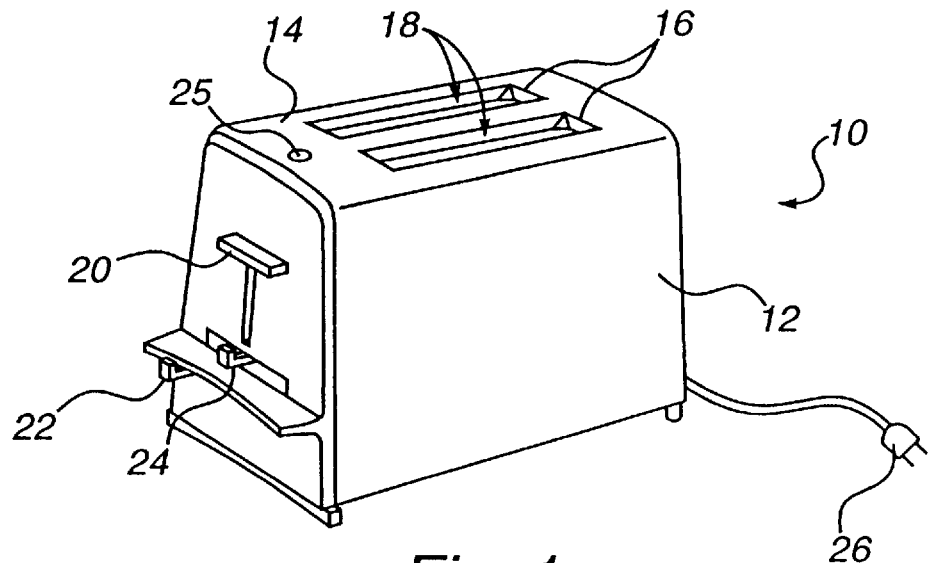
FIG. 1 is a side perspective view of a toaster implementing the present invention.

Referring to FIG. 1, shown is a toaster 10 of the present invention which, but for the improvement described herein, may otherwise be conventional. Toaster 10 includes a housing 12 having a top surface 14 that defines two toasting slots 16 into which the food product to be toasted is inserted. Toasting slots 16 open into toasting cavities 18 that are located within the interior of housing 12 and which are heated by conventional toaster heating elements (not shown in FIG. 1). A toast carriage (also not shown) is positioned within toasting cavities 18 for holding the food product to be toasted. A plunger 20 is provided for initiating a toasting cycle by lowering the toast carriage, and thus the food product, into toasting cavities 18.

Toaster 10 also includes a doneness control 22 that enables the operator of the toaster to select the extent to which the food product inserted within toasting slots 16 is to be toasted. As described below, the setting of control 22 affects the duration of the toasting cycle. A food type selector 24 enables the operator of the toaster to input the type of food that is to be toasted. The setting of selector 24 also affects the duration of the toasting cycle so as to accommodate the different times that are required to toast different food products to a particular doneness level. Positioned on surface 14 of toaster 10 is a termination button or control 25 which, as described below, enables the operator to prematurely terminate a toasting operation, if desired. An electrical plug 26 is also provided for insertion within a conventional wall outlet, or the like, wherefrom current, typically AC, associated with an operating (line) voltage is obtained.

Figure 2:
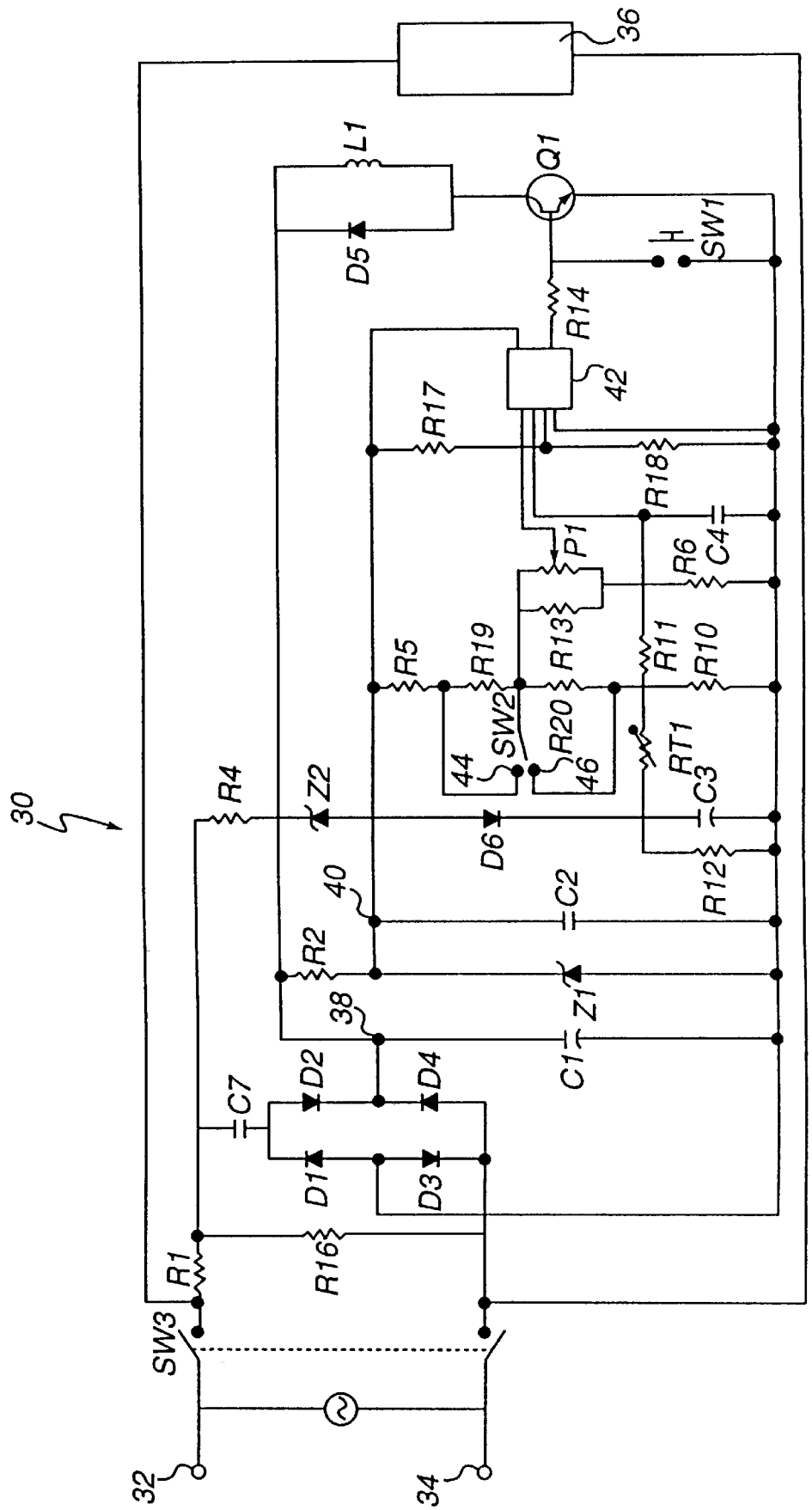
FIG. 2 is a schematic circuit diagram showing a control circuit of a toaster in accordance with the preferred embodiment of the present invention.

Shown in FIG. 2 is the electrical control circuit 30 for toaster 10. AC associated with an operating voltage is supplied to circuit 30 via terminals 32 and 34 which are electrically connected to an electrical plug 26. The circuit 30 includes a switch SW3 which, when closed, couples the AC operating voltage to the rest of the circuit 30. Closure of the switch SW3 occurs when a toasting cycle is initiated by manually lowering the toast carriage via the plunger 20. As described below, an electromagnet L1 of the circuit 30 holds the toast carriage down, and thus maintains the switch SW3 closed, for the duration of the toasting cycle.

The circuit 30 includes conventional heating elements 36 (shown in block diagram form in FIG. 2) which are located within the toasting cavities 18 of the toaster 10. When switch SW3 is closed, heating elements 36 are energized and generate heat so as to toast the food product that is placed in the toast carriage. The remainder of circuit 30 is coupled to the AC operating voltage, when switch SW3 is closed, through current limiting resistor R1 which is a 33 Ohm resistor in the preferred embodiment.

Capacitor C7 of circuit 30 is an impedance limiting component across which a voltage drop of approximately 85 volts is experienced during the toasting operation. Diodes D1, D2, D3, and D4 form a full wave rectifier which, in conjunction with filter capacitor C1, provide approximately 25 volts DC at node 38 of circuit 30. Resistor R2, zener diode Z1, and filter capacitor C2 reduce this voltage and provide approximately 5.1 volts DC at node 40 of circuit 30. In the preferred embodiment, resistor R2 is a 1.8 KOhm resistor, zener diode Z1 is a 5.1 volt diode, and capacitors C7, C1, and C2 are 1 uF (250 volt), 22 uF (63 volt), and 0.1 uF (50 volt) capacitors, respectively. Other combinations and values for these components are, of course, possible as will now be readily apparent to those of ordinary skill in the art.

Circuit 30 includes a timing circuit that determines the duration of the toasting cycle. The timing circuit includes a voltage divider network comprised of resistors R5, R19, R20, R13, R10, and R6, potentiometer P1, and switch SW2. The voltage divider network controls the voltage supplied to pin 1 of an ASIC (Application Specific Integrated Circuit) 42 which is also part of the timing circuit and is described in greater detail below in connection with FIG. 3. Switch SW2 of the voltage divider network is controlled by the food type selector 24 (FIG. 1) and, in the preferred embodiment shown in FIG. 2, has an upper position (contacting terminal 44), a center position, and a lower position (contacting terminal 46). Each position affects the magnitude of the voltage supplied to pin 1 of ASIC 42, with the pin 1 voltage decreasing as switch SW2 is moved from its upper position down to its lower position. Potentiometer P1 of the voltage divider network is controlled by the doneness control 22 (FIG. 1) and, in the preferred embodiment, is a 500 KOhm potentiometer. The setting of potentiometer P1 also affects the magnitude of the voltage supplied to pin 1 of ASIC 42. In the preferred embodiment, resistors R5, R19, R20, R13, R10, and R6 of the voltage divider network are 1.82 KOhm, 562 Ohm, 3.92 KOhm, 47.5 KOhm, 2.67 KOhm, and 41.2 KOhm resistors, respectively. Other combinations and values for these components are, of course, possible as will now be readily apparent to those of ordinary skill in the art.

The timing circuit also includes a temperature compensation circuit comprised of a power resistor R16 and a thermistor RT1. For reasons discussed below, these components are carefully selected so as to be compatible with one another such that changes in the heat generated by power resistor R16 cause thermistor RT1 to change resistance in a particular desired manner. Resistor R16, an 18 KOhm carbon film resistor in the preferred embodiment, is coupled to the AC operating voltage through resistor R1 and switch SW3, and is located outside of and thermally remote from toasting cavities 18. A voltage is applied across resistor R16, thus generating heat and raising the temperature thereof, only when heat is similarly being separately generated in toasting cavities 18 via heating elements 36.

The temperature characteristics of resistor R16 model that of toasting cavities 18. Specifically, the thermal mass, wattage characteristics, and thermal time constant of R16 are such that its rate of heat transfer is relatively low. This, in effect, means that it takes a relatively long time for R16 to heat up or cool down. Thus, the temperature thereof will be elevated, and will stay elevated for a certain duration of time, so as to emulate the change of temperature characteristics of toasting cavities 18 over consecutive toasting cycles.

Thermistor RT1 of the temperature compensation circuit is, in the preferred embodiment, a negative temperature coefficient thermistor having a resistance of 150 KOhms at room temperature. It is part of an RC network, along with resistor R11 and capacitor C4, that is coupled to pin 2 of ASIC 42 and to the AC operating voltage through diode D6, zener diode Z2, and resistor R4. Thermistor RT1, which is outside of and thermally remote from toasting cavities 18 but in close physical and thermal proximity to resistor R16, senses the temperature of resistor R16. The resistance of thermistor RT1 varies, in an inversely proportional manner, with variations in the sensed temperature of resistor R16. The resistance of thermistor RT1, in turn, controls the rate of charging of capacitor C4 of the RC network that is coupled to pin 2 of ASIC 42, with the rate of charging of capacitor C4 being inversely proportional to the magnitude of the resistance of thermistor RT1. In the preferred embodiment, resistor R11 is a 90.9 KOhm resistor and capacitor C4 is a 0.082 uF (50 volt) capacitor.

The timing circuit also includes a voltage compensation circuit, comprised of resistor R4, zener diode Z2, diode D6, resistor R12, and capacitor C3, that is coupled to the AC operating voltage through resistor R1 and switch SW3. Diode D6 of the voltage compensation circuit functions as a half wave rectifier and capacitor C3 functions as a filter. The voltage compensation circuit continuously responds to changes in the magnitude of the AC operating voltage, occurring anytime during or before a toasting operation, by dynamically generating, at the point between resistor R12 and diode D6, a voltage that is, in the preferred embodiment, approximately proportional to the square of the AC operating voltage. This approximation is valid throughout the typical range of variation of the AC operating voltage. The magnitude of this generated voltage affects the rate of charging of capacitor C4 of the RC network that is coupled to pin 2 of ASIC 42, with the rate of charging of capacitor C4 affecting the duration of the toasting cycle, as described below. Specifically, if the generated voltage increases (due to an increase in the AC operating voltage), then capacitor C4 charges at a higher rate which, as described below, reduces the duration of the toasting cycle. If the generated voltage decreases (due to a decrease in the AC operating voltage), then capacitor C4 charges at a lower rate which, as described below, increases the duration of the toasting cycle. In the preferred embodiment, zener diode Z2 is a 75 volt diode, capacitor C3 is a 47 uF (25 volt) capacitor, and resistors R4 and R12 are 12.1 KOhm resistors.

As mentioned above, the voltage generated between resistor R12 and diode D6 of the voltage compensation circuit is, in the preferred embodiment, approximately proportional to the square of the AC operating voltage. Because the wattage characteristics of heating elements 36, which directly affect the amount of heat generated, are also proportional to the square of the AC operating voltage (power=$V^2$/R), the voltage generated at the point between resistor R12 and diode D6 is proportional to the actual heat that is generated by heating elements 36. Thus, a change in the generated voltage, caused by an AC line voltage fluctuation, causes a change in the charging rate of capacitor C4 that is proportional to the change in heat generated by heating elements 36. Because the rate of charging of capacitor C4 directly affects the duration of the toasting cycle, as described below, this relationship (between the charging rate of capacitor C4 and the heat generated by heating elements 36) enables the duration of the toasting cycle to vary in proportion to, or track, variations in the heat generated by elements 36 so that consistent toasting results are achieved. In this manner, the voltage compensation circuit quickly, dynamically, and effectively compensates for fluctuations in the AC line voltage.

Although the preferred embodiment of the present invention compensates for fluctuations in the AC operating voltage by generating a voltage that is approximately proportional to the square of the AC operating voltage, other relationships between the generated voltage and the AC operating voltage are possible which, though less preferred, would still enable the duration of the toasting cycle to substantially track variations in the heat generated by heating elements 36. The generated voltage in these circumstances would still vary as a non-linear function of the AC supply voltage in order to remain substantially proportional to the amount of heat that is generated by heating elements 36.

Figure 3:
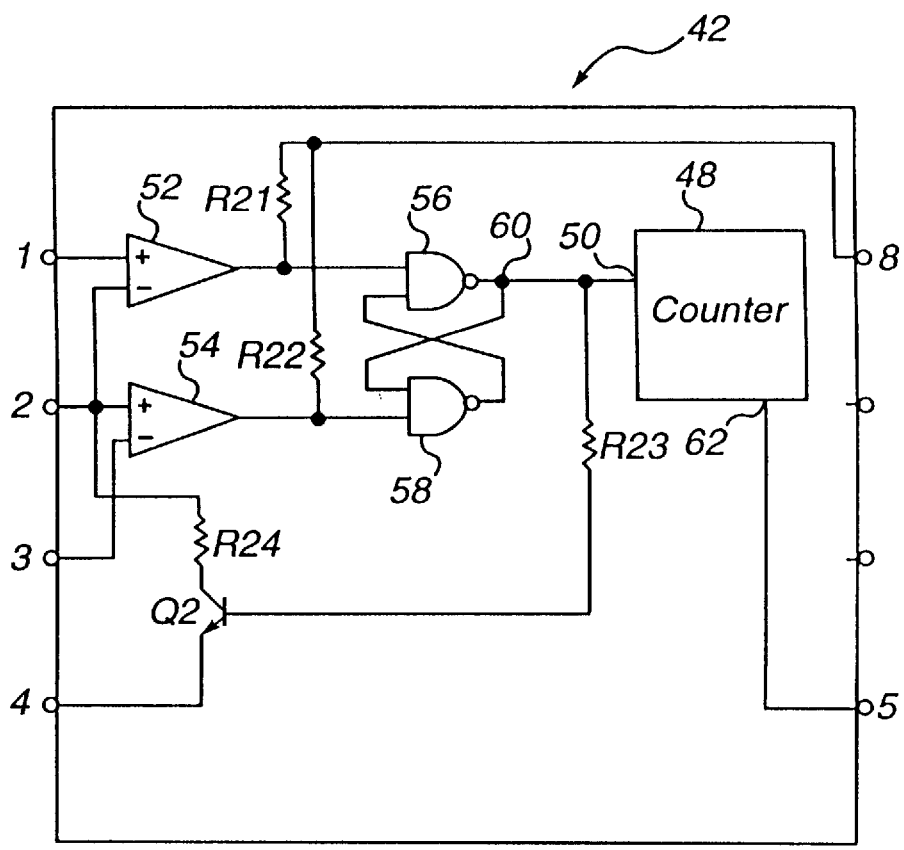
FIG. 3 is a schematic circuit diagram showing the details of the Application Specific Integrated Circuit shown in FIG. 2.

FIG. 3 shows the details of ASIC 42 of the timing circuit. ASIC 42 includes a counter 48 that begins counting when a toasting cycle is initiated and which counts up to a predetermined number. In the preferred embodiment, counter 48 is a 16 stage counter which counts up to $2^{16}$ (65,536). As described below, the time period required for counter 48 to count to its predetermined number establishes the duration of the toasting cycle. This time period is inversely proportional to the counting rate of counter 48 which is controlled by the frequency of an oscillating signal that is supplied to terminal 50.

The frequency of the oscillating signal supplied to terminal 50 of counter 48 is dependent on the voltage signals supplied to comparators 52 and 54 of ASIC 42 via pins 1, 2, and 3. As described above, switch SW2 and potentiometer P1 determine the voltage supplied to pin 1 of ASIC 42, while the temperature compensation circuit and the voltage compensation circuit determine the voltage supplied to pin 2. As shown in FIG. 2, pin 3 of ASIC 42 is maintained at a voltage that is established by the voltage divider comprised of resistors R17 and R18. As is described below, the voltage on pin 1 must always be greater than the voltage on pin 3 in order for the timing circuit to function correctly. In the preferred embodiment, resistors R17 and R18 are 8.25 KOhm and 562 Ohm resistors, respectively.

Comparator 52 of ASIC 42 compares the voltage on pin 2 to the voltage on pin 1. When the voltage on pin 2 (rising according to the rate of charging of capacitor C4) is equal to the voltage on pin 1, the output of comparator 42 triggers a flip-flop, comprised of NAND gates 56 and 58, causing it to change the state of its output at node 60 (coupled to terminal 50 of counter 48) from low to high. When this occurs, transistor Q2 of ASIC 42 is driven which causes capacitor C4 to discharge through resistor R24. The voltage across capacitor C4 (the pin 2 voltage) then drops until it is equal to the voltage on pin 3. At that time, comparator 54 of ASIC 42, which compares the voltage on pin 2 to the voltage on pin 3, triggers the flip-flop which causes it to change the state of its output at node 60 from high to low. This turns off transistor Q2, thus enabling capacitor C4 to begin charging again. The process repeats itself, with the voltage on pin 2 fluctuating between the voltage on pin 1 and the lower voltage on pin 3, resulting in an oscillating signal that is provided to terminal 50 and which controls the counting rate of counter 48. The frequency of the oscillating signal, and thus the duration of the toasting cycle, depends on the rate of charging of capacitor C4 (controlled by the temperature and voltage compensation circuits) and the magnitude of the voltage applied to pin 1 of ASIC 42 (controlled by switch SW2 and potentiometer P1). In the preferred embodiment, resistors R21, R22, R23, and R24 of ASIC 42 are 47 KOhm, 47 KOhm, 18 KOhm, and 1 KOhm resistors, respectively.

As mentioned above, the time period required for counter 48 to count to its predetermined number establishes the duration of the toasting cycle. As counter 48 is counting, terminal 62, and thus output pin 5 of ASIC 42, is kept at a high state. Output pin 5 of ASIC 42 is coupled to a transistor Q1 through a resistor R14 that is a 2.2 KOhm resistor in the preferred embodiment. When output pin 5 is high, transistor Q1 is driven which energizes electromagnet L1. Energization of electromagnet L1, which is a 25 volt electromagnet in the preferred embodiment, causes it to continue the toasting cycle, initiated by the manual lowering of the toast carriage via plunger 20, by holding the toast carriage down which keeps switch SW3 closed and heating elements 36 energized.

When counter 48 counts up to its predetermined number, output pin 5 is switched to a low state which turns off transistor Q1, thus deenergizing electromagnet L1. This terminates the toasting cycle by releasing the toast carriage which opens switch SW3 and deenergizes heating elements 36. As such, switch SW3, electromagnet L1, and transistor Q1 comprise a coupling circuit that couples heating elements 36 to the AC operating voltage for the duration of the toasting cycle as established by the timing circuit described above. In the preferred embodiment, a diode D5 is connected across electromagnet L1 which protects transistor Q1 by eliminating any voltage spikes that are generated upon turnoff of electromagnet L1.

In operation, the operator of toaster 10 places a food product within toasting cavities 18, selects a doneness level via doneness control 22, and inputs the type of food product via food type selector 24. A toasting operation is then initiated by the manual lowering of plunger 20. The duration of the toasting cycle is controlled, via the voltage applied to pin 1 of ASIC 42, by the settings of doneness control 22 and food type selector 24. The duration of the toasting cycle is also controlled, via the voltage applied to pin 2 of ASIC 42 corresponding to the rate of charging of capacitor C4, by operation of the temperature compensation and voltage compensation circuits. The voltage compensation circuit compensates for fluctuations in the AC line voltage, occurring anytime during or before the toasting operation, by dynamically generating a voltage which, in the preferred embodiment, is approximately proportional to the square of the AC operating voltage. Changes in the generated voltage dynamically adjust the rate of charging of capacitor C4 which adjusts the duration of the toasting cycle. Specifically, the voltage compensation circuit increases the duration of the toasting cycle if the AC line voltage decreases, and decreases the duration of the toasting cycle if the AC line voltage increases.

The specific duration of the toasting cycle can be calculated according to the following equation:

$$\text{Toasting Cycle Duration} = -RC \ln((V_0 - V_h)/(V_0 - 0.32))$$

wherein R is the resistance of resistor R11 plus the resistance of thermistor RT1, C is capacitor C4, $V_0$ is the voltage across capacitor C3 of the voltage compensation circuit, and $V_h$ is the voltage on pin 1 of ASIC 42.

Control circuit 30 also includes a switch SW1 which is controlled by termination control 25 of FIG. 1. When manually closed by the operator during a toasting operation, switch SW1 causes the voltage at the base of transistor Q1 to be substantially lowered, thus turning transistor Q1 off. This quickly terminates the toasting cycle, as described above, without regard to the state of output pin 5 of ASIC 42. Cancel button 25 is thus useful in situations where the operator of the toaster desires to prematurely terminate a toasting operation.

The present invention provides a means of compensating for the effects on the operation of electric devices caused by fluctuations in operating voltage. In particular, a voltage compensation means is provided which compensates for fluctuations in operating voltage in a quick and effective manner.

The above description is considered that of the preferred embodiments only. Modifications of the invention will occur to those skilled in the art and to those who make or use the invention. Therefore, it is understood that the embodiments shown in the drawings and described above are for illustrative purposes and are not intended to limit the scope of protection of the invention, which is defined by the following claims as interpreted according to the principles of patent law.

I claim:

1. An electrical device for generating heat for a predetermined period of time, said electrical device comprising:

a. a heating cavity;

b. a heating element powered by an operating voltage having a magnitude, said heating element being disposed within said heating cavity;

c. a first circuit which generates a control voltage wherein said control voltage varies as a function of said magnitude of said operating voltage; and d. a second circuit, coupled to said first circuit, which varies the duration of said period of time as a function of said control voltage generated by said first circuit, wherein said period of time is lengthened when said magnitude of said operating voltage decreases and shortened when said magnitude of said operating voltage increases.

2. The electrical device of claim 1 wherein said control voltage is substantially proportional to the square of said operating voltage.

3. The electrical device of claim 1, further comprising:

a. a first resistor, located outside of and thermally remote from said heating cavity, said first resistor having thermal characteristics modeling those of said heating cavity and wherein said first resistor generates heat when coupled to said operating voltage; and b. a second, temperature sensitive resistor located in close physical and thermal proximity to said first resistor whereby the resistance of said second resistor is a function of the temperature of said first resistor.

4. The electrical device of claim 1 wherein said electric device is a toaster.

5. The control of claim 4 further comprising a doneness control for enabling an operator of said toaster to select a desired toasting doneness level, and wherein the duration of said heating cycle is modified according to said selection.

6. The control of claim 4 further comprises a food type selector for enabling an operator of the toaster to select the type of food to be toasted, and wherein the duration of said heating cycle is modified according to said selection.

7. An electrical device powered by an operating voltage having a magnitude wherein said electrical device generates heat for a predetermined period of time, said electrical device further comprising:

a. a timing circuit for controlling the length of said period of time;

b. a voltage compensation means coupled to said timing circuit whereby said length of said period of time is dynamically increased when said magnitude of said operating voltage decreases and dynamically decreased when said magnitude of said operating voltage increases; and c. a temperature compensation means coupled to said timing circuit whereby said length of said period of time is increased when the initial temperature of said electrical device is decreased and decreased when the initial temperature of said electrical device is increased.

8. The electrical device of claim 7 wherein said control further comprises:

a. a capacitive element having a charge-discharge cycle time wherein said voltage compensation means and said temperature compensation means affect the rate of charging of said capacitive element;

b. a counter which counts said charge-discharge cycles of said capacitive element;

wherein said heating cycle is terminated when said counter has counted a predetermined number of said charge-discharge cycles of said capacitive element.

\* \* \* \* \*